Dec. 26, 1950     D. L. MASSEY     2,535,435
COUPLING
Filed June 7, 1948

Dulas L. Massey, Inventor

By E. V. Hardway, ATTORNEY.

Patented Dec. 26, 1950

2,535,435

UNITED STATES PATENT OFFICE 2,535,435

COUPLING

Dulas L. Massey, Houston, Tex.

Application June 7, 1948, Serial No. 31,512

6 Claims. (Cl. 285—146)

This invention relates to a coupling and has particular relation to a coupling for tubular sections.

The invention is specially adapted for use in a drill stem or other well tubing which is made up of sections.

The coupling, when incorporated into a drill stem, is usually located at or near the drill so that in case the drill should become stuck in a well bore the drill stem may be reversely rotated and separated at this particular coupling so that the entire stem can be removed.

It is another object of the invention to provide a coupling of the character described commonly known as a safety joint and which comprises a tubular female member provided with internal threads and a tubular male member, or pin, having external threads to intermesh with the threads of the female member and an interengaging ring around the male member and whose end faces are adapted to interlock with the abutting end of the female member and with a friction face on the pin member, when the parts are screwed home, the abutting parts of the ring and the box member being so shaped that upon reverse rotation the joint will readily break so that the parts may be unscrewed and separated.

It is a further object of the invention to provide, in a safety joint of the character described, opposing cam faces on the abutting ends of the ring and female, or box, member which will take the torsional strain of a drill stem, or other tubing subjected to torsion and which upon reverse rotation will readily release to take the tension off of the threads so that the joint members of the coupling may be easily unscrewed and released.

It is a further object of the invention to provide in a coupling, or safety joint of the character described an internally threaded box member and an externally threaded pin member screwed into the box member with a ring around the pin member, the abutting ends of said ring and box member having cam faces as above described and the pin member and ring having co-operating friction faces which will wedge together when the pin member is screwed to home position in the box member whereby said ring will rotate as a unit with the pin member thereby transferring the full torsional strain to said contacting cam faces.

Other objects and advantages will be apparent from the following specification which is illustrated by the accompanying drawings, wherein.

Figure 1:
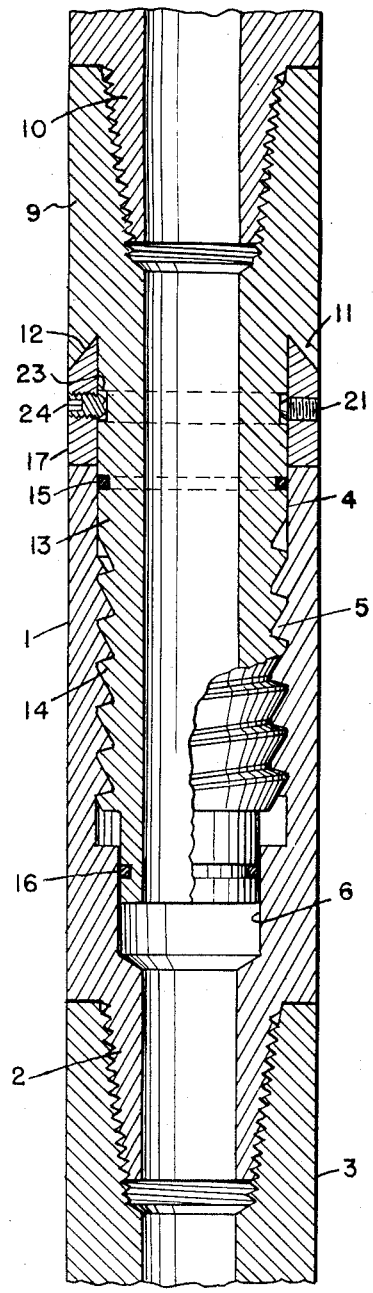
Figure 1 is a longitudinal, sectional view of the coupling.

Referring now more particularly to the drawings the numeral 1 designates the female, or box, member which may be reduced and formed into a tapering pin at its lower end to be screwed into the adjacent end of the tubular section 3 of the drill stem beneath.

The upper end of the box member has the internally blank portion 4 and beneath said blank portion has the internal coarse threads 5. Beneath said threaded portion the member 1 is reduced, internally, in diameter thus providing an internal blank portion 6.

Figure 3:
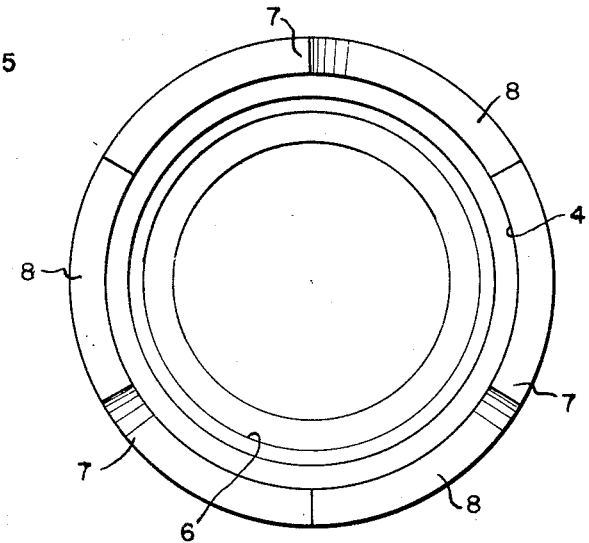
Figure 3 is a top end view of the box member.

The upper end of the female, or box, member is provided with corresponding pitched cam faces 7, 7, 7, three of said cam faces being shown, which may be given any desired pitch and beyond said cam faces, in a clockwise direction, as shown in Figure 3, the upper end of the box member is relieved, that is it is provided with the faces 8, 8, 8 which are of the same pitch as the pitch of the threads 5.

The numeral 9 designates, generally, a pin member, or male member, whose upper end is internally threaded to receive the externally threaded pin 10 of the tubular section above.

The lower end of the pin member is reduced in diameter in such manner as to form a downwardly flared shoulder 11 thus providing an annular groove 12 whose outer side tapers upwardly at any selected angle, preferably about a forty degree angle. The reduced lower end of the pin member forms a pin 13 whose upper end is externally blank to fit into the internal blank portion 4 of the box member and whose lower end is externally blank to fit into the blank portion 6 of the box member.

Between the blank portions of the pin said pin is provided with the external threads 14 adapted to intermesh with the threads 5 when the pin is screwed home in the box.

The upper and lower blank portions of the pin have external annular grooves to receive the upper and lower O-rings 15 and 16 thus forming efficient seals to prevent leakage of the fluid flowing through the tubular stem.

Figure 2:
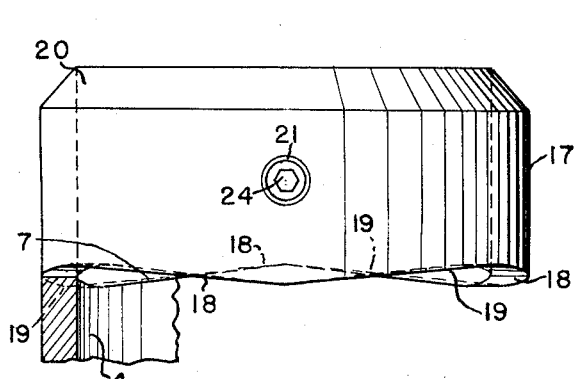
Figure 2 is an enlarged, side elevation of the interlocking ring employed in its relation to the box member shown partially in section.

The overhanging shoulder 11 of the pin member is spaced from the facing end of the box member by means of an interlocking ring 17. This ring is shown, more in detail in Figure 2. It has alternate cam faces 18, 18, 18 of the same pitch as that of the corresponding cam faces 7 and forwardly of said faces 18 it has the relieved portions, or faces, 19, 19, 19 which are of the same pitch as that of the threads.

The upper end of the ring 17 has the external upwardly tapering face 20 and this tapering portion of the ring fits into the groove 12 and conforms to the taper thereof.

This ring may have one or more set screws, as 21, threaded radially therethrough and whose inner ends project into an external annular groove 23 in said pin member, which groove is somewhat wider than the corresponding diameter of the screw, or screws, 21. The screws 21 do not contact the pin member, thus allowing free rotation and endwise movement of the ring 17 when the pin and box threads are not fully screwed together. When the pin is screwed to home position in the box then the screws 21 are tightened up and for this purpose said screws are provided in the outer ends with polygonal sockets, as 24, to receive a wrench whereby they may be screwed up or unscrewed.

The corresponding cam faces of the ring and box member are manually matched together just before the intermeshing threads of the pin and box are fully screwed together. When said threads are fully screwed together the tapering portion of the ring is wedged tightly in the groove 12. This firmly attaches the ring to the pin member thereby transferring full torsional strain to the co-operating cams of the respective members; also the ring member will be wedged into the groove 12 so tightly that the ring will be firmly attached to the pin member until reverse rotation is applied to partially unscrew the pin from the box.

The fact that the faces 8 are of the same pitch as that of the threads makes the free reverse rotation of one member relative to the other, possible; and since the cams may be of any desired pitch the amount of reverse torque required to release the joint is determined by the amount of such pitch.

The free rotation of the ring, prior to the final screwing up of the pin member into the box member allows any pin member and any box member to be interchangeable by reason of the fact that the cam faces on the ring and box may be adjusted relative to each other. This adjustment of the cam faces relative to each other also becomes necessary due to wear on the threads of the two members.

Once sufficient reverse torque is applied to either of the members to initially unscrew them the cam faces will move apart thus relieving the tension so that the joint may thereafter readily be unscrewed.

As hereinabove stated screws 21 are provided so that when the pin member is screwed into the box member to home position said screws 21 may be tightened up so as to hold the cam faces thereof in a fixed position relative to the cam faces of the box member. This is desirable for the reason that after the coupling has been broken out and the drill stem withdrawn it may be desirable to again lower the drill stem and connect the coupling and for that purpose it is desirable that the ring 17 remain in fixed position on the pin 13.

The drawings and description disclose what is now considered to be a preferred form of the invention while the broad principle of the invention will be defined by the appended claims.

What I claim is:

1. A coupling for tubular sections comprising, a box member having internal threads, a pin member having external threads adapted to be screwed into said internal threads and having an external, tapering groove, a ring around the pin member one end of which is tapering and arranged to wedge in said groove and whose other end abuts the opposing end of the box member, when said members are screwed together to home position, cams on the abutting parts having faces pitched reversely of the pitch of the threads and arranged to contact when the sections are screwed together and whose other faces have the same pitch as the threads.

2. A coupling for tubular section comprising, a box member having internal threads, a pin member having external threads to be screwed into said internal threads and also having an external friction face, a ring around the pin member having, at one end, an annular face opposing said friction face and whose other end abuts the opposing end of the box member when said members are screwed together to home position, means for fixing the ring against movement on the pin member cam faces on the abutting parts of the ring and box member and which are pitched reversely of the pitch of the threads.

3. A coupling for tubular sections comprising, a box member having internal threads, a pin member having external threads adapted to be screwed into said internal threads and having an external friction face, a ring around the pin member having an annular end face opposing said friction face, the other end of the ring and the opposing end of the box member having cam faces pitched reversely of the pitch of the threads, said pin member having an external annular groove and a set screw threaded through the ring and whose inner end projects into said groove.

4. A coupling for tubular sections comprising, a box member having internal threads and internal blank areas on opposite sides of the threads, a pin member having external threads adapted to be screwed into said internal threads and also having an external friction face and external blank areas on opposite sides of the threads to fit into the corresponding blank areas of the box member when said threads are screwed home, seal rings forming seals between the blank areas of the pin member and box member, a ring around the pin member having, at one end, an annular face opposing said friction face and whose other end abuts the opposing end of the box member when said members are screwed together to home position, cam faces of the same pitch on the abutting parts of the ring and box member and which are pitched reversely of the pitch of the threads and arranged to contact when the sections are screwed together.

5. A coupling for tubular sections comprising, a box member having internal threads and internal blank areas on opposite sides of the threads, a pin member having external threads adapted to be screwed into said internal threads and also having an external friction face and external blank areas on opposite sides of the threads to fit into the corresponding blank areas of the box member when said threads are screwed home, seal rings forming seals between the blank areas of the pin member and box member, a ring around the pin member having, at one end, an annular face opposing said friction face and whose other end abuts the opposing end of the box member when said members are screwed together to home position, a set screw threaded through the ring and engageable with the pin, cams on the abutting parts having faces pitched reversely of the pitch of the threads and arranged to contact when the sections are screwed together and whose other faces have the same pitch as the threads.

6. A coupling for tubular sections comprising, a box member having internal threads, a pin member having external threads adapted to be screwed into said internal threads and having an external, tapering groove, a ring around the pin member, one end of which is tapering and arranged to wedge in said groove and whose other end abuts the opposing end of the box member, when said members are screwed together to home position, cam faces on the end of the box member, cam faces on the ring of the same pitch as that of the corresponding cam faces on the box member, said ring being provided with relieved faces forwardly of the cam faces and which are of the same pitch as that of the threads.

DULAS L. MASSEY.

REFERENCES CITED

The following references are of record in the file of this patent:

UNITED STATES PATENTS

| Number | Name | Date |
| --- | --- | --- |
| 1,837,639 | Wickersham | Dec. 22, 1931 |
| 2,202,260 | Osmun | May 28, 1940 |
| 2,204,586 | Grau | June 18, 1940 |
| 2,320,107 | Speckert | May 25, 1943 |